(12) United States Patent
Matsu et al.

(10) Patent No.: US 7,784,828 B2
(45) Date of Patent: Aug. 31, 2010

(54) DUAL DEPTH AIRBAG WITH ACTIVE VENTING

(75) Inventors: Richard Matsu, Plymouth, MI (US); Scott Dershem, W. Bloomfield, MI (US); Don Paxton, Romeo, MI (US); Geoffrey Mills, Lake Orion, MI (US); Brian Seymour, Oakland Township, MI (US); Dave Zecchin, Sterling Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 230 days.

(21) Appl. No.: 12/046,014

(22) Filed: Mar. 11, 2008

(65) Prior Publication Data

US 2009/0230663 A1 Sep. 17, 2009

(51) Int. Cl.
*B60R 21/239* (2006.01)

(52) U.S. Cl. .................................. 280/739; 280/743.2

(58) Field of Classification Search .................. 280/739, 280/743.2
See application file for complete search history.

(56) References Cited

U.S. PATENT DOCUMENTS

| | | | |
|---|---|---|---|
| 6,390,501 B1 * | 5/2002 | Greib et al. | 280/743.2 |
| 6,832,778 B2 | 12/2004 | Pinsenschaum et al. | |
| 7,195,281 B2 * | 3/2007 | Williams et al. | 280/743.2 |
| 7,377,548 B2 * | 5/2008 | Bauer et al. | 280/743.2 |
| 2006/0071461 A1 * | 4/2006 | Williams et al. | 280/739 |

* cited by examiner

*Primary Examiner*—Eric Culbreth
(74) *Attorney, Agent, or Firm*—Sally J Brown; Stoel Rives LLP

(57) ABSTRACT

An inflatable airbag cushion assembly with a release device for electronic communication with a sensor in a vehicle. The cushion assumes two different configurations depending on the occupant's position. The configurations are achieved via tethers along with closeable vent(s) to control cushion pressure.

8 Claims, 13 Drawing Sheets

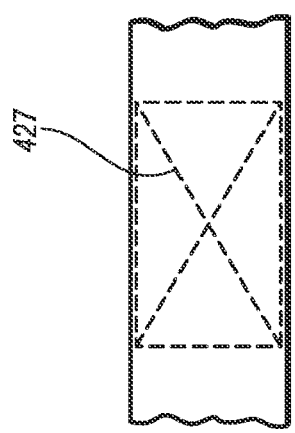
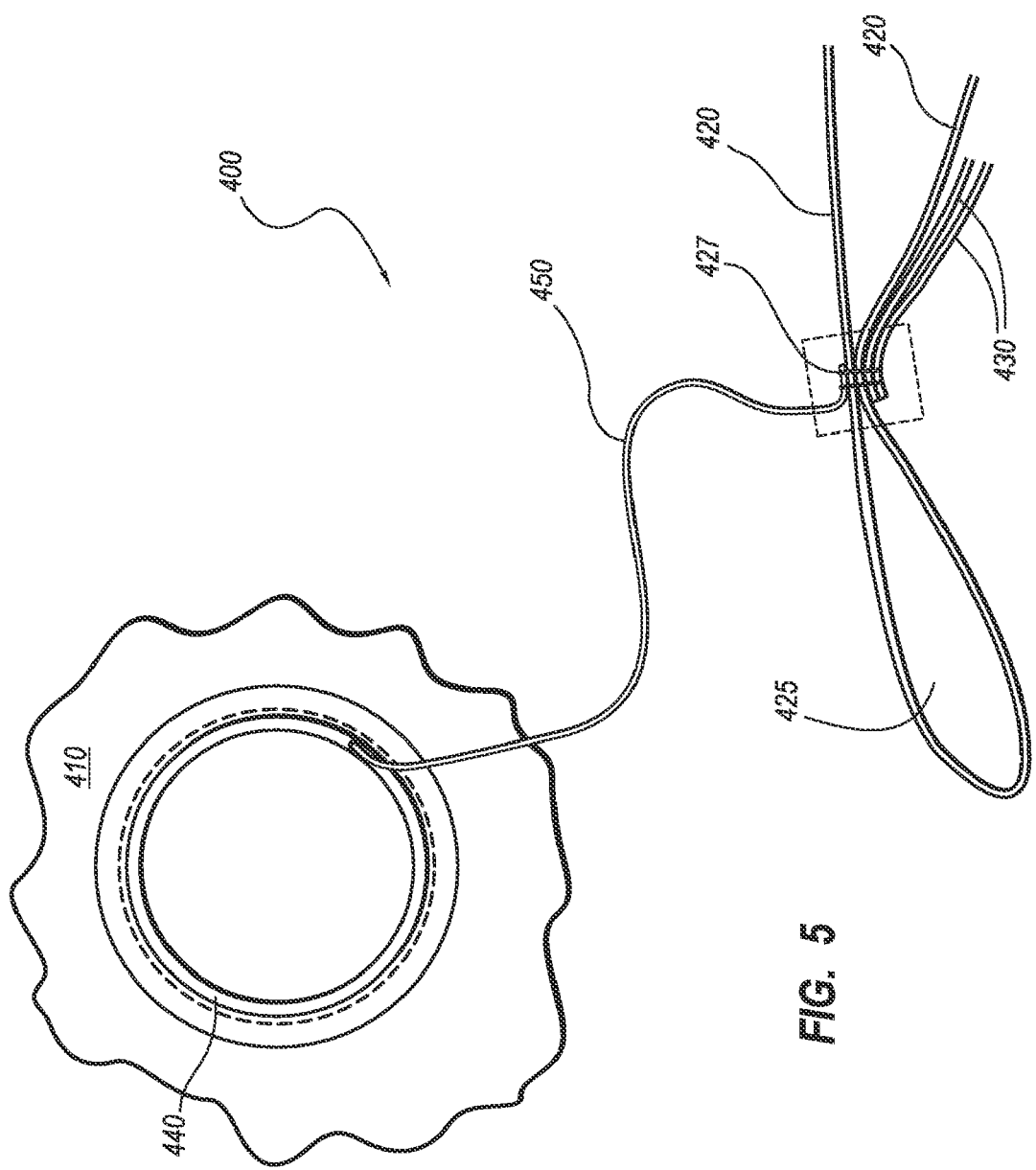

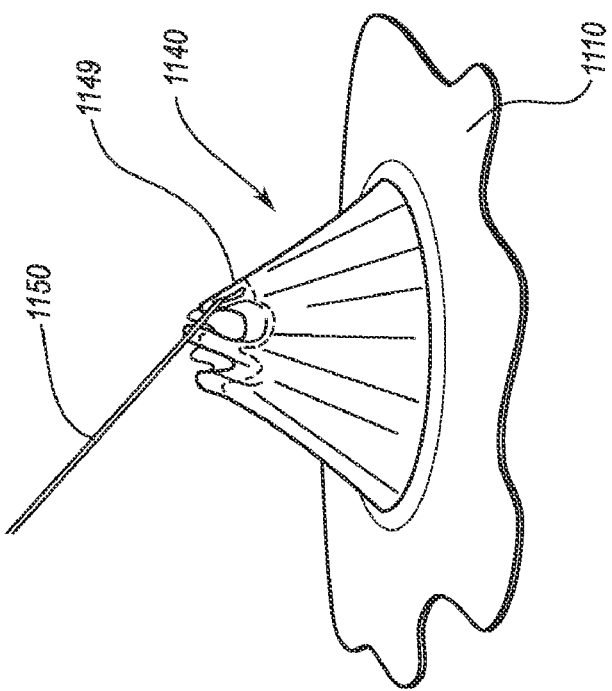
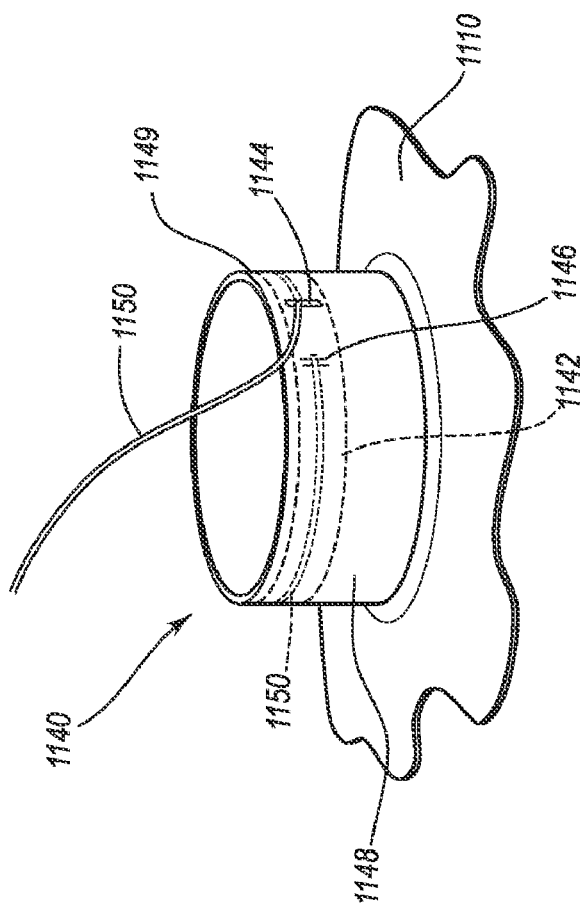

DUAL DEPTH AIRBAG WITH ACTIVE VENTING

TECHNICAL FIELD

The present invention relates generally to the field of automotive protective systems. More specifically, the present invention relates to a system for selectively venting inflation gases from an inflatable passenger side airbag.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 5 is a side elevation detail view of a portion of the inflatable airbag cushion assembly of FIG. 4A.

FIG. 6 is a side elevation view of a portion of the inflatable cushion airbag assembly of FIG. 4A.

FIG. 11A is a perspective view of one embodiment of a closeable vent, which is a component of an inflatable cushion airbag assembly, wherein the closeable vent is in an open conformation.

FIG. 11B is a perspective view of the closeable vent of FIG. 11A, wherein the closeable vent is in a closed conformation.

Figure 1:
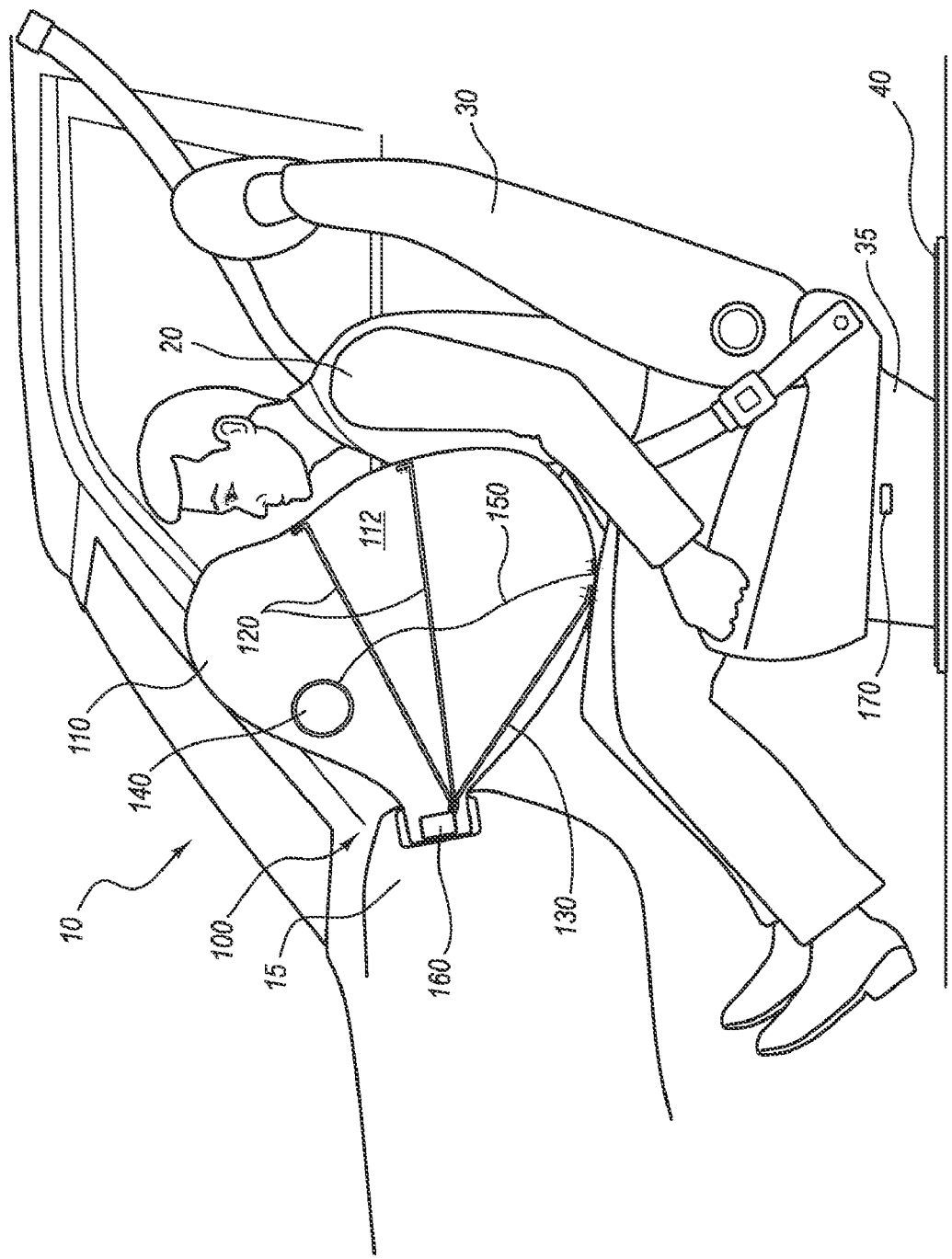
FIG. 1 is a side elevation view of one embodiment of an inflatable passenger airbag assembly mounted in a vehicle, wherein the airbag assembly is partially cutaway and is deployed to a first configuration.

INDEX OF ELEMENTS IDENTIFIED IN THE DRAWINGS 10 vehicle
15 instrument panel
20 occupant
30 seat
35 seat rail
40 seat mount
100 inflatable cushion airbag assembly
110 airbag membrane
112 airbag interior
120 airbag depth restraining tether
130 airbag height restraining tether
140 closeable vent
150 closeable vent strap
160 release device
170 seat rail sensor
180 split panel
400 inflatable cushion airbag assembly
410 airbag membrane
412 airbag interior
420 airbag depth restraining tether
425 loop
427 stitching
430 airbag height restraining tether
440 closeable vent
450 closeable vent strap
460 release device
720 airbag depth restraining tethers
725 stitching
730 airbag height restraining tethers
735 stitching
790 ring
800 airbag assembly
810 airbag membrane
820 airbag depth restraining tether
840 closeable vent
850 closeable vent strap
860 release device
900 airbag cushion assembly
910 airbag membrane
920 airbag depth restraining tether
940a closeable vent
940b closeable vent
950a closeable vent strap
950b closeable vent strap
960 release device
1000 airbag assembly
1010 airbag membrane
1020 airbag depth restraining tether
1030 airbag height restraining tether
1040a closeable vent
1040b closeable vent
1050a closeable vent strap
1050b closeable vent strap
1060 release device 1110 airbag membrane
1140 closeable vent
1142 sleeve
1144 sleeve aperture
1146 stitching
1148 cinch tube
1149 rim
1150 closeable vent strap
1200 airbag cushion assembly
1210 cushion membrane
1220 airbag depth restraining tether
1222 intermediate portion
1224 distal portions
1226 end portion of tether
1240 closeable vent
1260 release device
1300 airbag cushion assembly
1310 airbag membrane
1320 airbag depth restraining tether
1340a closeable vent
1340b closeable vent
1350a vent strap
1350b vent strap
1360 release device

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to", "coupled to" and "in communication with" refer to any form of interaction between two or more entities, including mechanical, electrical, magnetic, electromagnetic, fluid and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. Thus the airbag rapidly changes confirmations from the rolled/folded configuration to an expanded configuration.

When an occupant is out of position or seated too closely to a surface from which an airbag will deploy, it is advantageous for an airbag to be deployed to one or more configurations, depending on the position of the occupant within the vehicle. It is also advantageous to be able to vent inflation gas from the airbag to soften it for small occupants and occupants who are out of position.

Some of the embodiments disclosed herein include an airbag assembly comprising one or more closeable vents, at least one closeable vent strap, at least one airbag height restraining tether, at least one airbag depth restraining tether, a release device and a seat-rail sensor. Some or all of these components may be used in combination and in different quantities to provide an airbag assembly, which may be used to provide optimal cushioning for occupants who are out of position, seated close to the panel from which the airbag will deploy, or are seated in a normal manner.

FIG. 1 depicts one embodiment of a multi-stage airbag assembly with venting from a side elevation view, in which the airbag assembly is partially cutaway. In this view only one side of the airbag is depicted. A complete airbag assembly may comprise at least two of all the components depicted in FIG. 1. See FIG. 3A for a depiction of an airbag assembly in which both sides can be seen.

In this embodiment, an inflatable cushion airbag assembly 100 is mounted within an instrument panel 15 located at the front of a vehicle 10. The complete inflatable cushion airbag assembly may comprise an airbag membrane 110, one or more airbag depth restraining tethers 120, one or more airbag height restraining tethers 130, one or more closeable vents 140, one or more closeable vent straps 150, a release device 160, and a seat rail sensor 170.

Airbag membrane 110 is in fluid communication with an inflator (not shown) within instrument panel 15. The shape of airbag membrane 110 depicted in FIG. 1 is for illustrative purposes only; the actual shape of airbag membrane 110 may be any suitable shape.

Release device 160 may constitute the inflator itself, may be part of the inflator, or release device 160 may be a mechanism separate from the inflator, such as an actuator commonly known to one skilled in the relevant art. Release device 160 may be positioned partially within the airbag membrane 110 and is fixedly coupled to the instrument panel or other vehicle structure.

Airbag depth restraining tether 120 is fixedly coupled to release device 160 and may extend to, and be fixedly coupled to, the face-proximal surface of airbag membrane 110. Airbag depth restraining tether 120 may be coupled to release device 160 via a loop formed by airbag depth restraining tether 120, or by a connector, such as a ring, or pin (see FIG. 5 and FIG. 7 for a more complete description as to how an airbag depth restraining tether may be coupled to a release device). In one embodiment, airbag depth restraining tether 120 may comprise 25 mm wide webbing, such as that used in child seats. Airbag depth restraining tether 120 may be attached to airbag membrane 110 via stitching, welding, gluing, or any other suitable fastener.

The location of the points at which airbag depth restraining tether 120 are attached to airbag membrane 110 in FIG. 1 are for illustrative purposes only. In fact, airbag depth restraining tether 120 may be attached at any suitable position on the face proximal surface of airbag membrane 110. Airbag depth restraining tether 120 may comprise a strip of synthetic woven material, such as nylon, or any other suitable material known to one skilled in the art.

Airbag height restraining tether 130 may be coupled to airbag depth restraining tether 120 using a fastener, such as stitching. Since airbag depth restraining tether 120 may be coupled to release device 160, airbag height restraining tether 130 is also coupled to release device 160. Alternatively, airbag height restraining tether 130 may be coupled to release device 160 independent of airbag depth restraining tether 120 (see FIG. 5 and FIG. 7 and accompanying text (below) for a description of how an airbag height and an airbag depth restraining tether may be coupled). Airbag height restraining tether 130 may be coupled to the lap-proximal surface of airbag membrane 110 via stitching, welding, gluing, or any other suitable fastener. Airbag height restraining tether 130 may comprise a strip of synthetic woven material, such as nylon, or any other suitable material known in the art. In one embodiment, airbag depth restraining tether 120 may comprise 25 mm wide webbing, such as that used in child seats.

Closeable vent 140 may comprise an aperture in airbag membrane 110, which is surrounded by a closeable vent. One type of closeable vent that may be used is a cinch tube vent of the type found in U.S. patent application Ser. No. 10/959,256 filed on Oct. 6, 2004, and published as U.S. Patent Publication No. 2006/0071461, which is hereby incorporated by reference. Although airbag assembly 100 may be deployed to more than one configuration, it may be used with a single stage inflator because of the use of closeable vent 140. The use of a single stage inflator reduces the cost of airbag assembly 100. The position of closeable vent 140 on airbag membrane 110 as shown in FIG. 1 is for illustrative purposes only and may be varied to suit different applications. Please see FIGS. 11A-11B and accompanying text for a complete description of one embodiment of a cinch tube vent.

Closeable vent strap 150 may be coupled to closeable vent 140 and extend to the lap-proximal surface of airbag membrane 110 (see FIGS. 11A-11B for more information on how a closeable vent strap may be coupled to a closeable vent). Closeable vent strap may be of such a length, that when airbag membrane 110 is deployed to the first configuration, closeable vent strap 150 is in a relaxed state and when airbag membrane 110 is deployed to the second configuration, tension is applied to closeable vent strap 150.

Closeable vent strap 150 may be attached to airbag membrane 110 via stitching, welding, gluing, or any other suitable fastener. Closeable vent strap 150 may comprise a nylon woven fabric or any other suitable material known in the art. In one embodiment, airbag depth restraining tether 120 may comprise 25 mm wide webbing, such as that used in child seats.

FIG. 1 depicts an occupant 20, seated on a seat 30, which is positioned relatively close to the instrument panel 15, such that a seat rail 35 is slid forward on seat mount 40. A seat rail sensor 170 may sense the position of seat 20 by sensing the position of seat rail 35 on seat mount 40. Thus, the for/aft position of occupant 20 may be detected and electronically communicated to release device 160. Seat rail sensor 170 may be of any type commonly known to one skilled in the art.

In a collision event, vehicle body sensors (not shown) may trigger the activation of an inflator (not shown) which begins to fill airbag membrane 110 with inflation gas, thereby deploying it from a rolled and/or folded configuration to an extended configuration. Since occupant 20 is positioned within a predetermined distance from the instrument panel 15 (as reported by seat rail sensor 170) upon deployment of airbag membrane 110, release device 160 does not release airbag depth restraining tether 120. Airbag depth restraining tether 120 is coupled to airbag height restraining tether 130 such that upon deployment, airbag membrane 110 is restrained in both its height and depth. This height and depth restrained deployment is termed the "first configuration" and is depicted in FIG. 1.

During the initial stage of airbag deployment closeable vent 140 may be in an open conformation, since closeable vent strap 150 is not under tension. As a result of vent 140 being in an open conformation, if an occupant is out of position and the airbag contacts them prematurely, vent 140 may vent inflation gas and provide a softer cushion membrane, which may protect the occupant from injury.

Additionally, upon deployment to the first configuration, closeable vent 140 may remain open due to airbag height restraining tether 130 restricting how far the lap-proximal surface of airbag membrane 110 drops toward the lap of occupant 20. Since the lap-proximal surface of airbag membrane 110 does not fully drop, closeable vent strap 150 does not fully extend and closeable vent 140 does not restrict inflation gas from venting from the interior of airbag membrane 110. As a result, excess inflation gas is vented via closeable vent 140.

Thus, the height, depth, and hardness of airbag membrane 110 are optimized for occupant 20, who is positioned within a predetermined distance from instrument panel 15 and for an occupant who is out of position. Further, small occupants are also optimally cushioned by airbag assembly 100, since small occupants typically sit closer to instrument panel 15, during a collision event airbag assembly 100 may deploy to the first configuration, wherein vent 140 is open, providing a softer cushion for smaller occupants.

Figure 2:
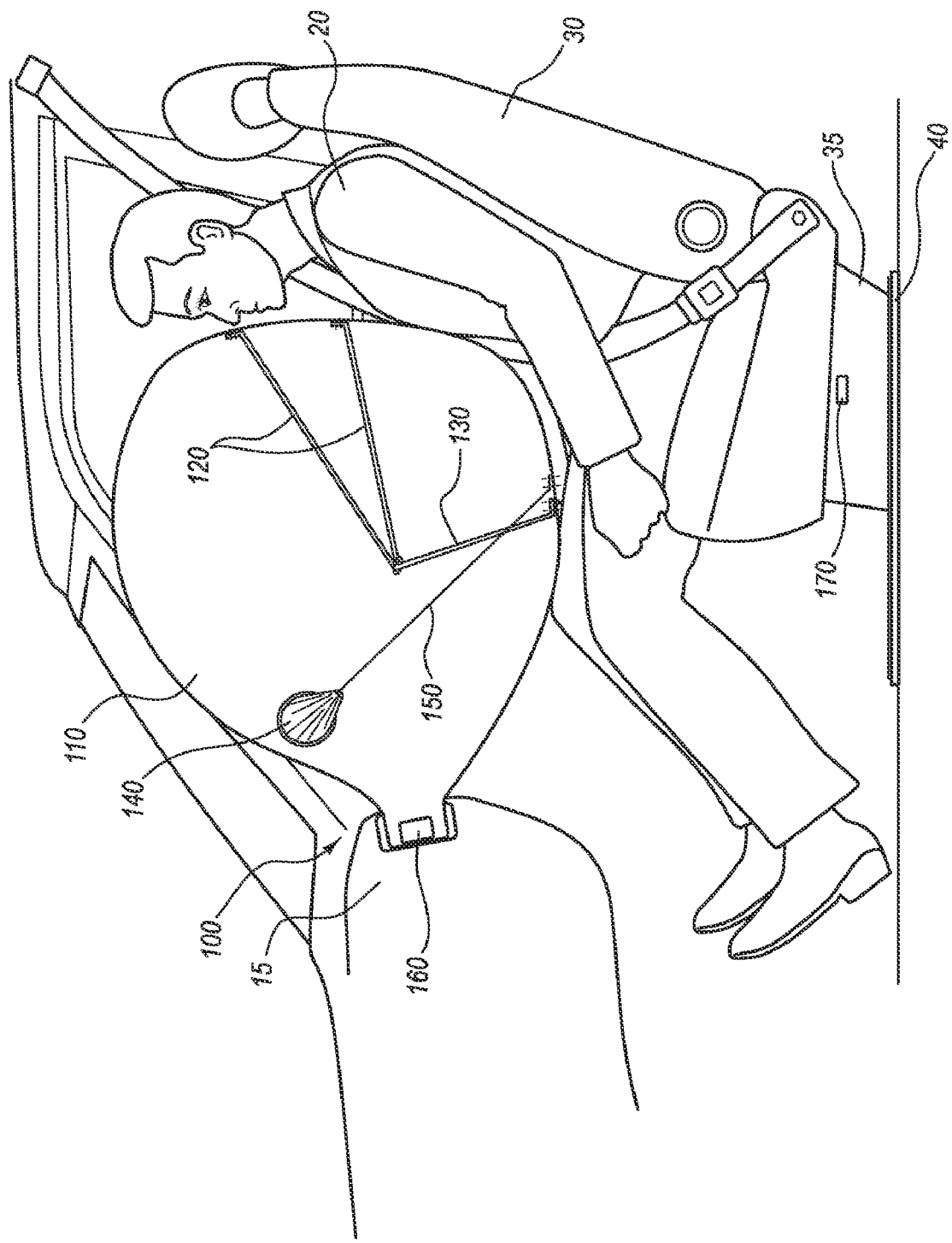
FIG. 2 is a side elevation view of the inflatable passenger airbag assembly of FIG. 1, wherein the airbag assembly is partially cutaway and is deployed to a second configuration.

FIG. 2 depicts airbag assembly 100 of FIG. 1 deployed to a second configuration, from a side elevation view in which airbag assembly 100 is partially cutaway. In FIG. 2, the seat of occupant 20 is further away from instrument panel 15 than in FIG. 1. Thus, the position seat rail 35 on seat rail mount 40 is further away from instrument panel 15, as compared to FIG. 1.

The position of the seat of occupant 20 may be communicated electronically from seat rail sensor 170 to release device 160. If the seat of occupant 20 is further from instrument panel 15 than a predetermined distance, during a collision event, release device 160 may release airbag depth restraining tether 120. The release of airbag depth restraining tether 120 also releases airbag height restraining tether 130, since the two tethers may be coupled. Release of airbag height and depth restraining tethers 120 and 130 allows airbag membrane 110 to maximally expand, which configuration is called the "second configuration."

Expansion of airbag membrane 110 in the lap-proximal direction eliminates the slack in closeable vent strap 150 and places tension on closeable vent strap 150. This tension causes closeable vent 140 to be at least partially closed, causing more inflation gas to be retained within airbag membrane 110 and assuring adequate pressure within airbag membrane 110 for cushioning occupant 20.

Figure 3A:
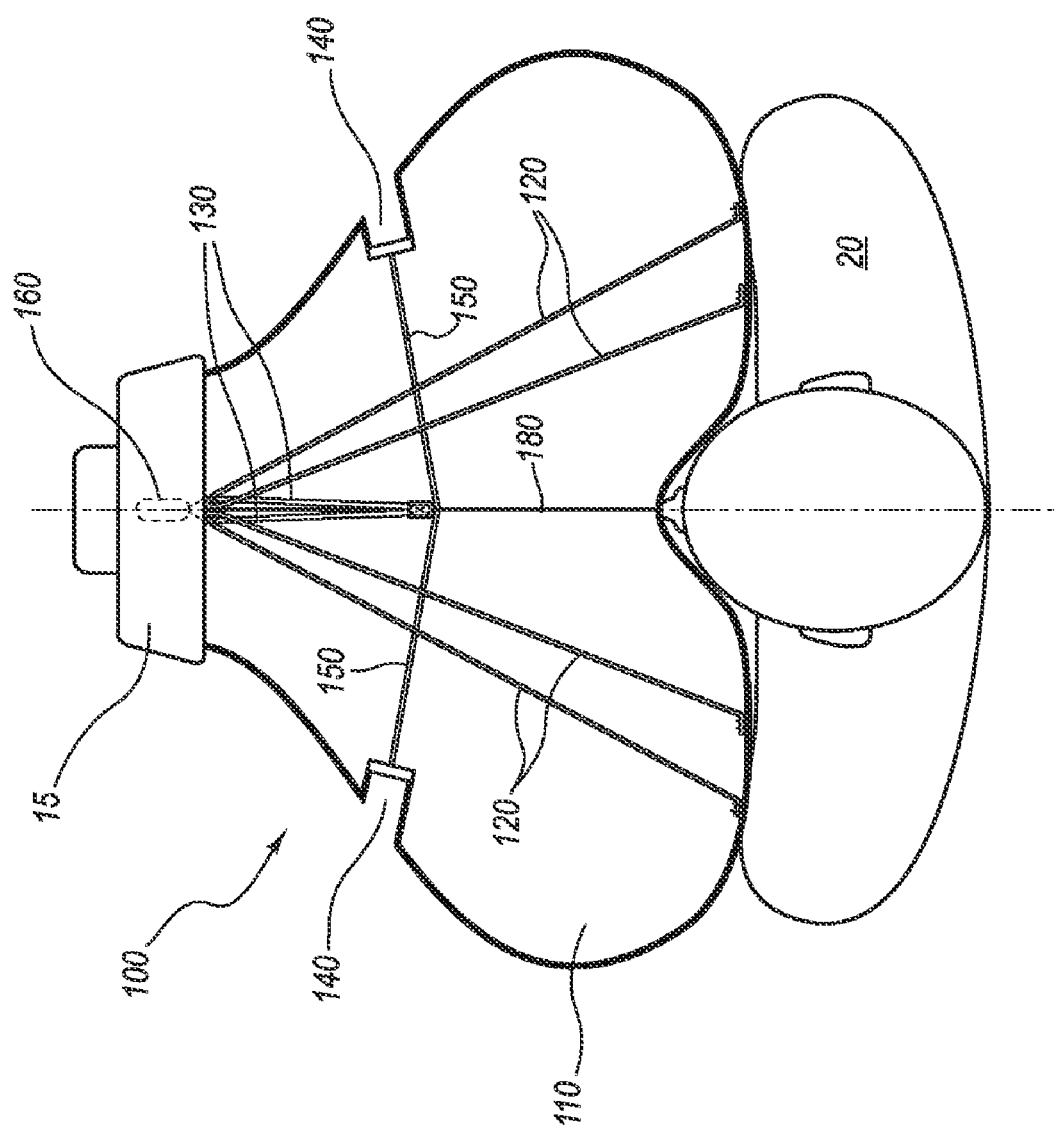
FIG. 3A is an overhead view of the inflatable passenger airbag assembly of FIG. 1, wherein the airbag is partially cutaway and is deployed to a first configuration.

FIG. 3A depicts airbag assembly 100 of FIG. 1 deployed to the first configuration, from an overhead view, in which airbag assembly 100 is partially cutaway. In this view, both sides of inflatable cushion airbag assembly 100 are visible.

Airbag height restraining tether 130 may be coupled on one end to release device 160, and on the other end, tether 130 may be attached to a split panel 180, which is disposed on the lap-proximal surface of airbag membrane 110. Airbag height restraining tether 130 may be attached to the split panel at a predetermined distance from the instrument panel.

Closeable vent strap 150 may be attached to split panel 180 at a predetermined distance in the occupant-proximal direction from the attachment of airbag height restraining tethers 130. In one embodiment, the center of closeable vent strap 150 and airbag height restraining tether 130 may be about one inch (2-4 centimeters) apart. In other embodiments, the distance between the center of closeable vent strap 150 and the center of airbag height restraining tether 130 may be configured differently to optimize airbag performance. Airbag height restraining tether 130 is attached to the split panel nearer the instrument panel than closeable vent strap 150. Closeable vent straps 150 are further coupled to closeable vents 140.

Figure 3B:
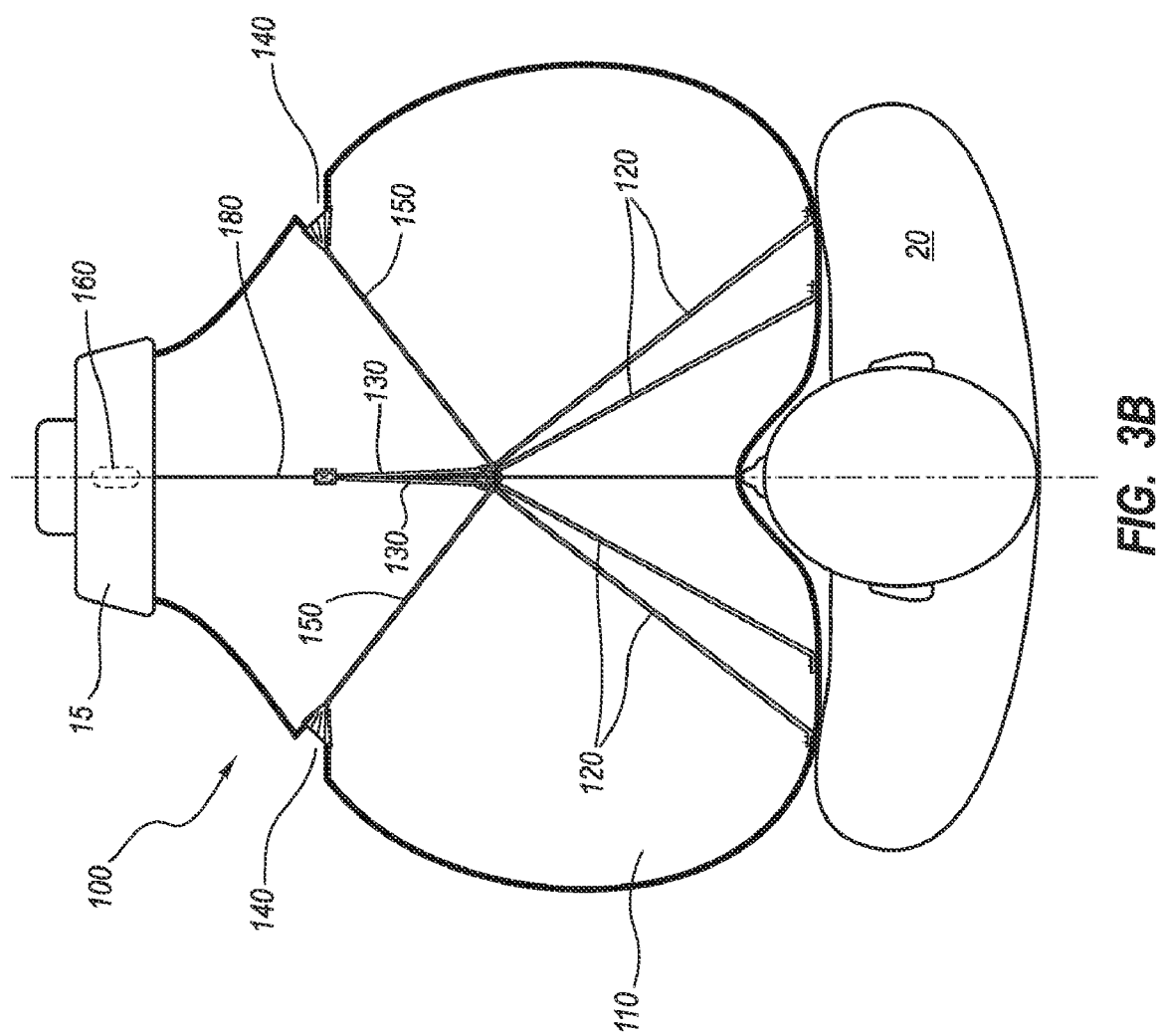
FIG. 3B is an overhead view of the inflatable passenger airbag assembly of FIG. 1, wherein the airbag is partially cutaway and is deployed to a second configuration.

Airbag depth restraining tethers 120 may be coupled to release device 160 on one end. As best seen in FIGS. 3A-3B, the other end may be attached to the face-proximal surface of airbag membrane 110 at a plurality of positions.

The position of occupant 20 is relayed to release device 160 from seat rail sensor (not shown). In FIG. 3A, occupant 20 is positioned within a predetermined distance from instrument panel 15, such that during a collision event, airbag membrane 110 may be deployed to the first configuration, wherein release device 160 does not release airbag depth and height restraining tethers 120 and 130. Since the lap proximal surface of airbag membrane 110 is restrained, closeable vent straps 150 do not restrict closeable vents 140 in their ability to vent inflation gas.

FIG. 3B is an overhead view of inflatable cushion airbag assembly 100 of FIG. 1, wherein the airbag assembly is partially cutaway. In the depiction of FIG. 3B, airbag assembly 100 is deployed to the second configuration.

In the depiction of FIG. 3B, occupant 20 is further away from instrument panel 15, when compared with FIG. 3A. If the seat of occupant 20 is determined to be further away from instrument panel 15 than a predetermined distance (as determined by the seat rail sensor (not shown)) during a collision event, release device 160 may release airbag depth and height restraining tethers 120 and 130.

The release of airbag height restraining tether 130 allows the lap-proximal surface of airbag membrane 110 to drop toward the lap of occupant 20. As a result, closeable vent strap 150 is elongated and at least partially closes closeable vent 140. The restriction of inflation gas venting through closeable vent 140 causes more inflation gas to be retained within airbag membrane 110, which assures adequate cushioning.

Figure 4B:
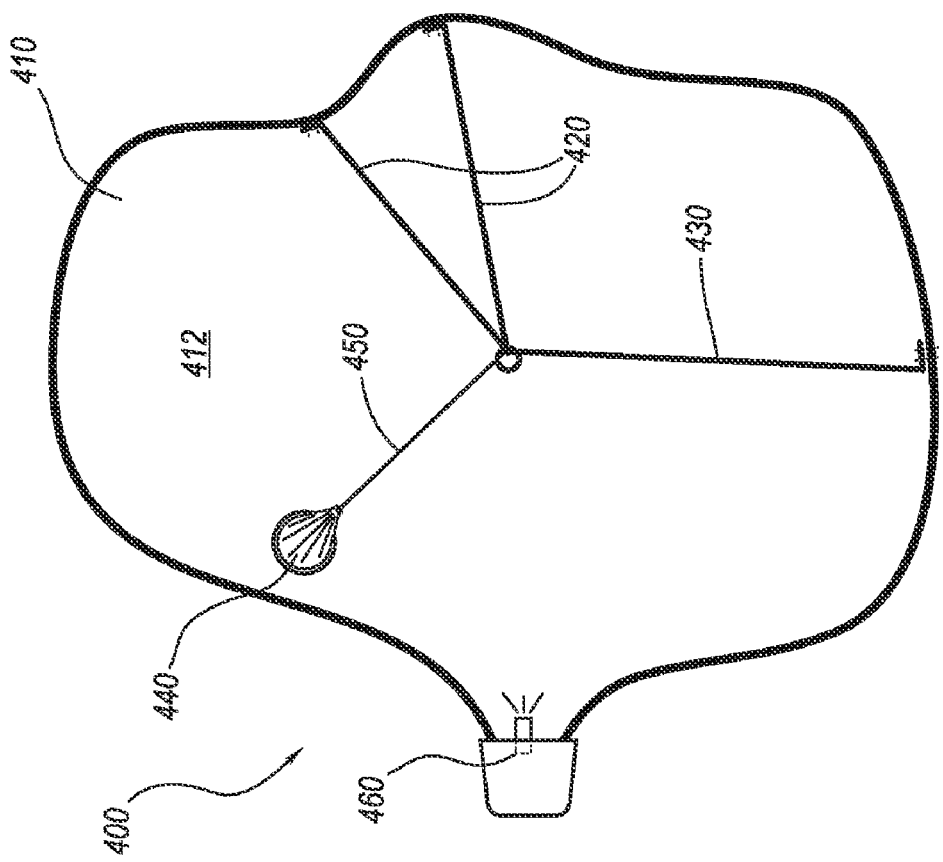
FIG. 4B is a side elevation cutaway view of the inflatable passenger airbag cushion assembly of FIG. 4A, wherein the airbag is deployed to a second configuration.
Figure 4A:
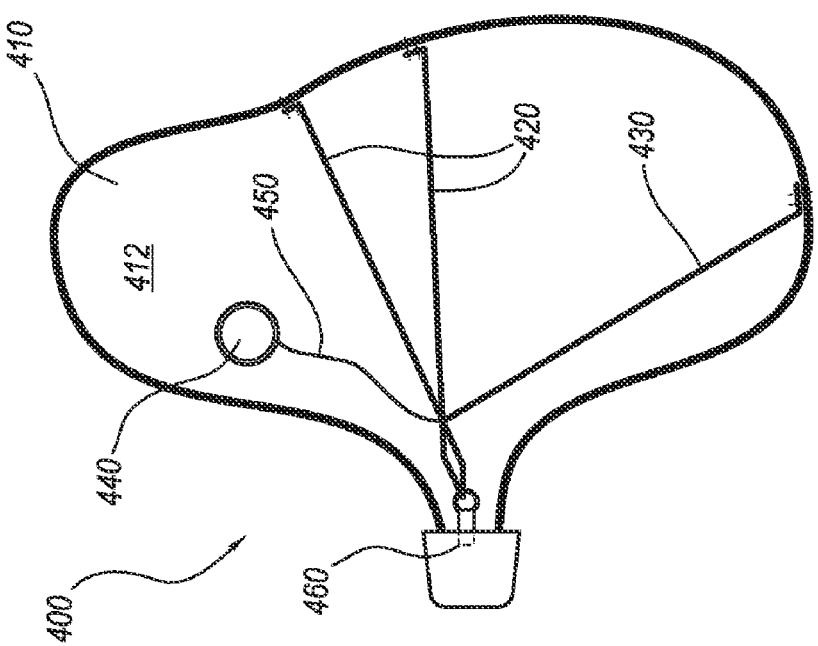
FIG. 4A is a side elevation cutaway view of another embodiment of an inflatable passenger airbag cushion assembly, wherein the airbag is deployed to a first configuration.

FIG. 4A and FIG. 4B are side elevation cutaway views of another embodiment of an inflatable cushion airbag assembly deployed to a first configuration and a second configuration, respectively. Inflatable cushion airbag assembly 400 may comprise an inflatable cushion membrane 410, one or more airbag depth restraining tethers 420, one or more airbag height restraining tethers 430, one or more closeable vents 440, one or more closeable vent straps 450, and a release device 460.

As with inflatable cushion airbag assembly 100, inflatable cushion airbag assembly 400 may be deployed to at least two configurations, and may be used with a single stage inflator. Inflatable cushion airbag assembly 400 may be mounted in an instrument panel in a vehicle and may be used in combination with a seat rail sensor.

Inflatable cushion airbag assembly 400 is configured similarly as inflatable cushion airbag assembly 100, except that closeable vent strap 450 is coupled to the airbag depth and height restraining tethers 420 and 430, instead of being attached to the lap-proximal surface of the airbag membrane like the embodiment described with reference to FIG. 1.

When airbag membrane 410 is deployed to the first configuration, closeable vent strap 450 is not under tension (FIG. 4A), and thus does not close closeable vent 440. When airbag membrane 410 is deployed to the second configuration, release device 460 releases airbag depth and height restraining tethers 420 and 430, which puts tension on closeable vent strap 450, causing closeable vent 440 to at least partially close and reduce the rate of gas venting.

FIG. 5 is a side elevation detail view of how some of the components of airbag assembly 400 may be coupled together. The depicted components include closeable vent 440, closeable vent strap 450, airbag depth restraining tether 420, airbag height restraining tether, 430.

Closeable vent 440 is disposed on airbag membrane 410. In the embodiment depicted, closeable vent strap 450 wraps around the circumference of closeable vent 440 (see FIGS. 11A-11B for additional detail regarding closeable vents). Closeable vent strap 450 may be coupled to airbag depth restraining tether 420 via stitching 427. Airbag height restraining tethers 430 may also be coupled to airbag depth restraining tether 420 via stitching 427. Airbag height restraining tethers may comprise a single piece of fabric, or may comprise two separate pieces of fabric as depicted in FIG. 5.

Loop 425 of airbag depth restraining tether 420 may be formed by folding a single piece of woven fabric back upon itself and connecting the arms of the free ends by stitching 427. Loop 425 may be used to couple airbag depth restraining tether 420 (and thus airbag height restraining tether 430, closeable vent 440, and closeable vent strap 450) to a release device (not shown). Alternatively, a ring or pin may be used to couple loop 425 to a release device.

FIG. 6 is a detail view of stitching 427 as seen from an overhead view. Stitching 427 is depicted in FIG. 6 as a boxstitch. In alternative embodiments, any other suitable fastener, such as staples, pins, welding, or gluing may be used.

Figure 7:
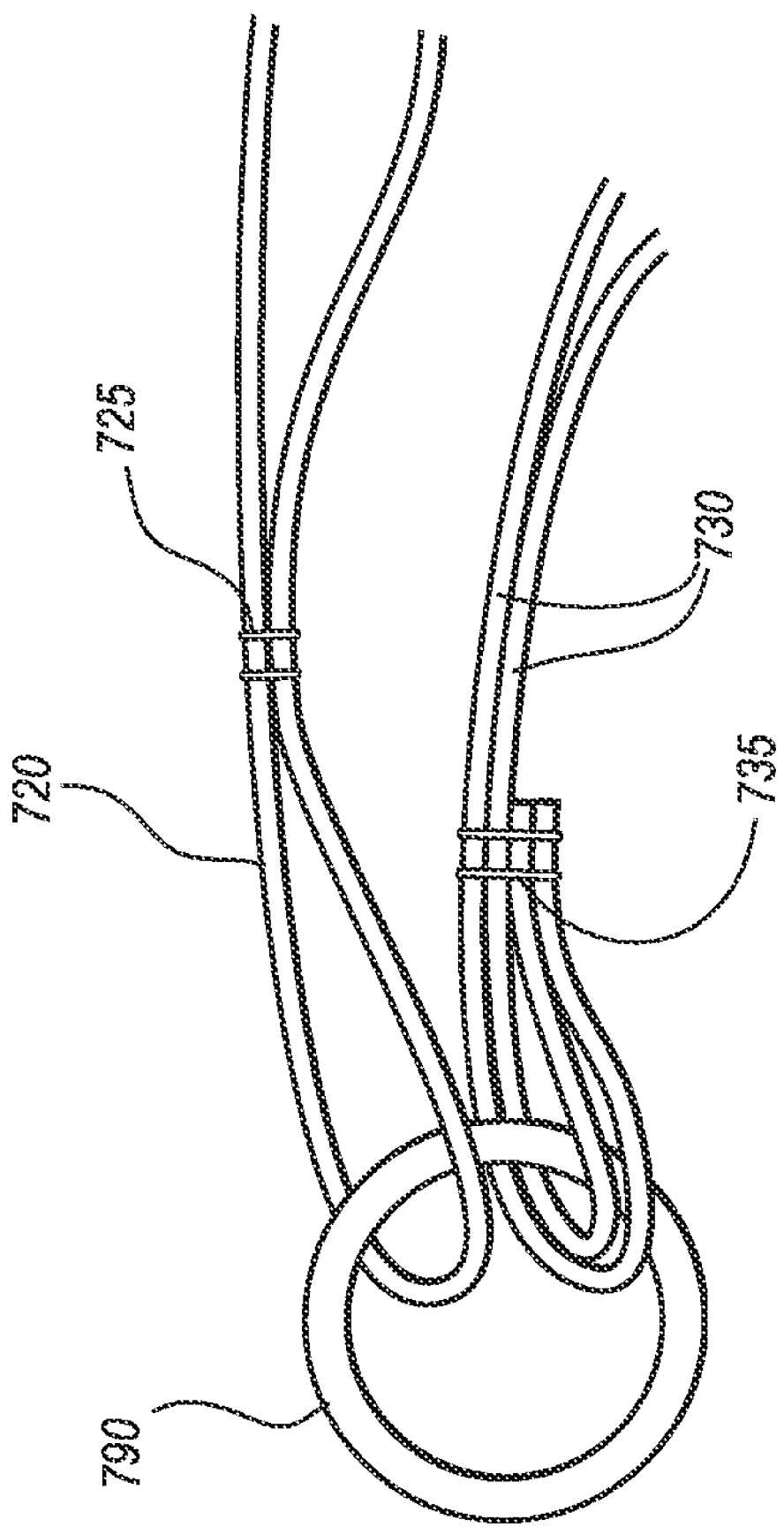
FIG. 7 is a side elevation detail view of an alternative embodiment of a portion of an inflatable cushion airbag assembly.

FIG. 7 depicts another embodiment of coupling some of the components of an airbag assembly like airbag assembly 400. Airbag depth restraining tether 720 may be configured from a single piece of fabric, which is threaded through a rigid planer ring 790, folded back upon itself, and connected to itself via stitching 725. Airbag height restraining tethers 730 are also threaded through ring 790 and sewn to themselves using stitching 735. Ring 790 may be coupled to a release device (not shown). Alternatively, separate rings may be used for airbag depth restraining tether 720 and airbag height restraining tethers 430. Further, one or more closeable vent straps (not shown) may be coupled to airbag height or depth restraining tethers 720 and 730 either by sewing to the tethers, by being coupled to a ring to which one of the tethers is coupled, or by being coupled to a separate ring. The rigid planer ring may be manufactured from metal, or any other suitable material.

Figure 8B:
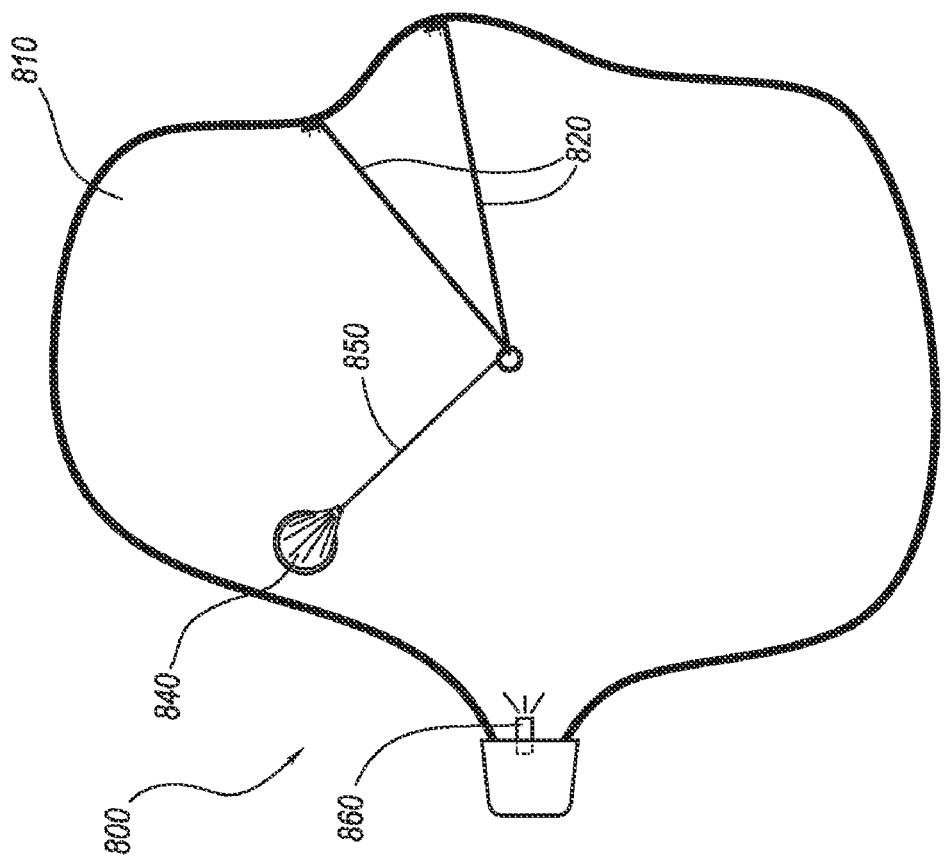
FIG. 8B is a side elevation cutaway view of the inflatable cushion airbag assembly of FIG. 8A, wherein the airbag is deployed to a second configuration.
Figure 8A:
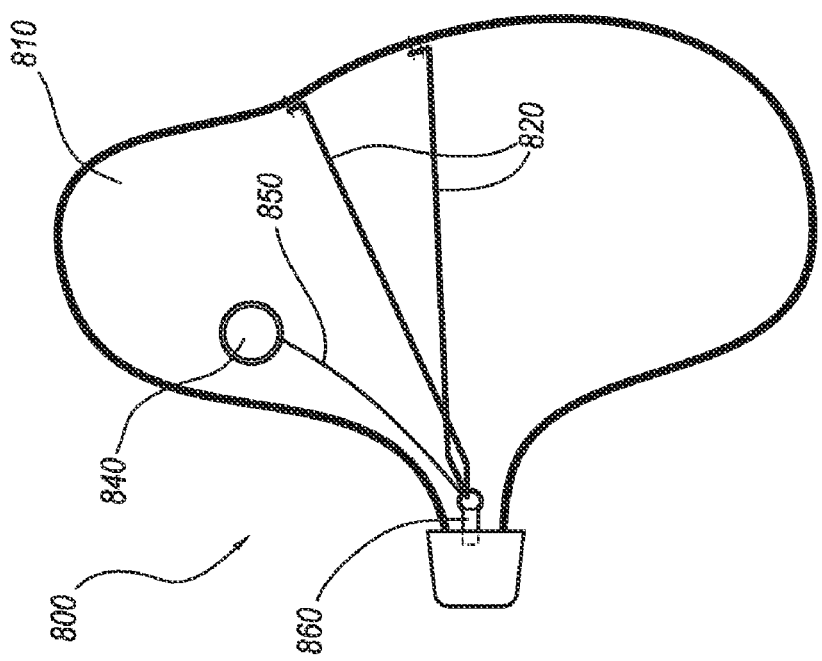
FIG. 8A is a side elevation cutaway view of another embodiment of an inflatable cushion airbag assembly, wherein the airbag is deployed to a first configuration.

FIG. 8A and FIG. 8B are side elevation cutaway views of another embodiment of an inflatable cushion airbag assembly deployed to a first configuration and a second configuration, respectively. Airbag assembly 800 is configured much like airbag assembly 100 and is designed to be used in a similar manner. Airbag assembly 800 may comprise an airbag membrane 810, one or more airbag depth restraining tethers 820, one or more closeable vents 840, one or more closeable vent straps, 850 and a release device 860. Compared to airbag assembly 100 (FIGS. 1-2), airbag assembly 800 lacks airbag height restraining tethers and closeable vent strap 850 is coupled to airbag depth restraining tether 820, instead of the lap-proximal surface of the airbag membrane as in airbag assembly 100.

Figure 9B:
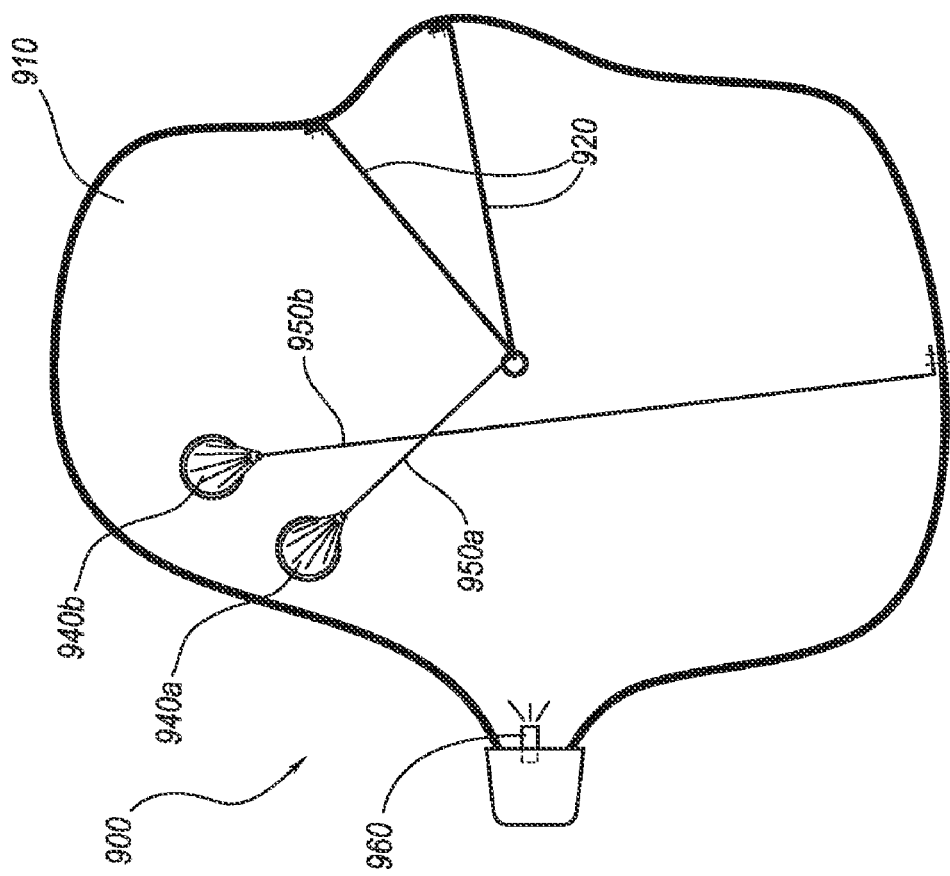
FIG. 9B is a side elevation cutaway view of the inflatable cushion airbag assembly of FIG. 9A, wherein the airbag is deployed to a second configuration.
Figure 9A:
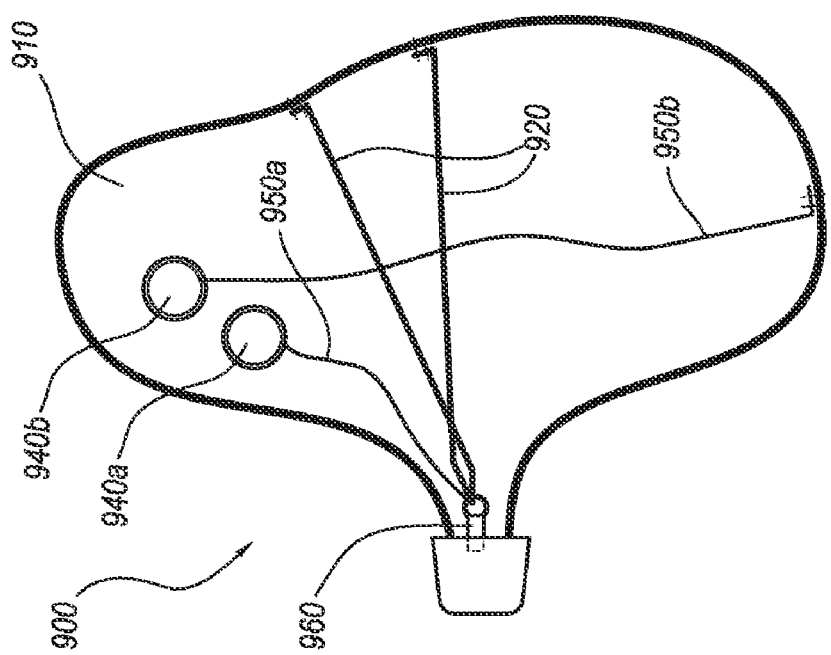
FIG. 9A is a side elevation cutaway view of another embodiment of an inflatable cushion airbag assembly, wherein the airbag is deployed to a first configuration.

FIG. 9A and FIG. 9B are side elevation cutaway views of another embodiment of an inflatable cushion airbag assembly deployed to a first configuration and a second configuration, respectively. Airbag assembly 900 is configured much like airbag assembly 100 and is designed to be used in a similar manner.

In this embodiment, inflatable airbag cushion assembly 900 may comprise an airbag membrane 910, and a release device 960, and on each side of the assembly, an airbag depth restraining tether 920, two closeable vents, 940a and 940b, and two closeable vent straps 950a and 950b. Closeable vent strap 950a is coupled airbag restraining tether 920, and the other closeable vent strap, 950b is coupled to a lap-proximal surface of airbag membrane 910 as in airbag assembly 100. Closeable vent 940a may also be called a safety vent, and closeable vent 940b may also be called an active vent.

In the depiction of FIG. 9A and FIG. 9B, safety vent 940a appears to be identical to active vent 940b. In other embodiments safety vent 940a may be identical to active vent 940b, and therefore, their nomenclature may be interchangeable. In other embodiments the vents may be identical, but the attachment points of their respective vent straps may differ. Further, safety vent 940a may be larger or smaller, and thus able to vent more or less gas than active vent 940b. Additionally, safety vent 940a may be a different type of vent than active vent 940b.

Figure 10B:
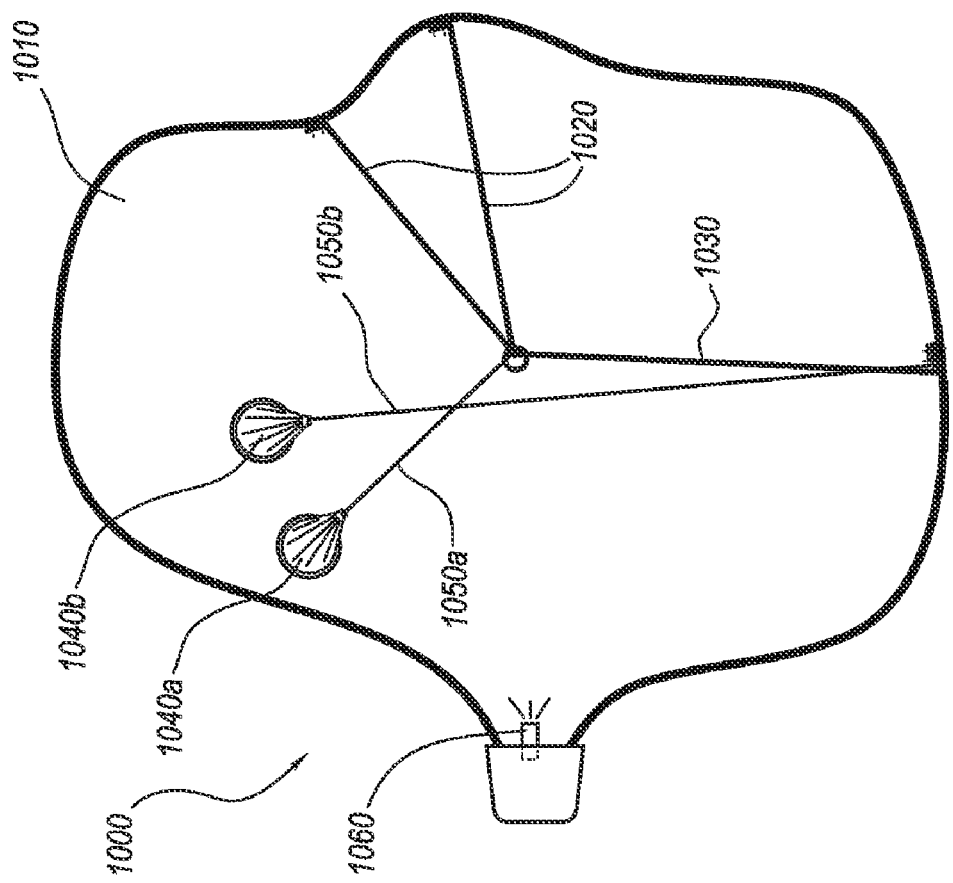
FIG. 10B is a side elevation cutaway view of the inflatable cushion airbag assembly of FIG. 10A, wherein the airbag is deployed to a second configuration.
Figure 10A:
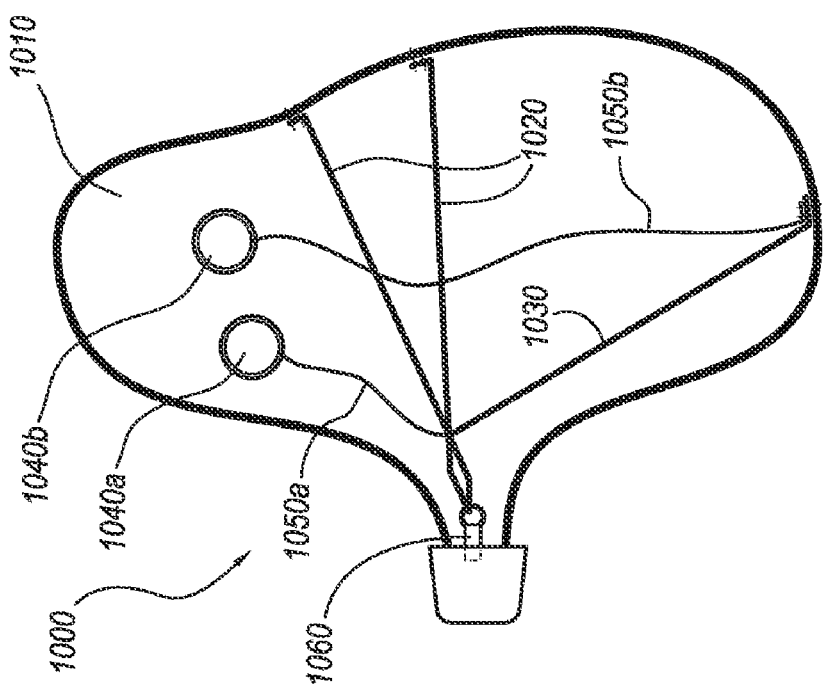
FIG. 10A is a side elevation cutaway view of another embodiment of an inflatable cushion airbag assembly, wherein the airbag is deployed to a first configuration.

FIG. 10A and FIG. 10B are side elevation cutaway views of another embodiment of an inflatable cushion airbag assembly deployed to a first configuration and a second configuration, respectively. Airbag assembly 1000 is configured much like airbag assembly 100 and is designed to be used in a similar manner.

In this embodiment, inflatable cushion airbag assembly 1000 may comprise an airbag membrane 1010, a release device 1060, and on each side of the assembly, an airbag depth restraining tether 1020, an airbag height restraining tether 1030, two closeable vents, 1040a and 1040b, two closeable vent straps 1050a and 1050b. Closeable vent strap 1050a is coupled to airbag depth restraining tether 1020, and closeable vent strap 1050b is coupled to the lap-proximal surface of airbag membrane 1010. Closeable vent 1040a may also be called a safety vent, and closeable vent 1040b may also be called an active vent.

In the depiction of FIG. 10A and FIG. 10B, safety vent 1040a appears to be identical to active vent 1040b. In other embodiments safety vent 1040a may be identical to active vent 1040b, and therefore, their nomenclature may be interchangeable. In other embodiments, the vents may be identical, but the attachment points of their respective vent straps may differ. Further, safety vent 1040a may be larger or smaller, and thus able to vent more or less gas than active vent 1040b. Additionally, safety vent 1040a may be a different type of vent than active vent 1040b.

FIG. 11A and FIG. 11B are perspective views of one embodiment of a closeable vent in an open and partially closed configuration, respectively. The depicted closeable vent is a cinch tube vent 1140, which may comprise a cinch tube 1148 with a rim 1149. The cinch tube vent is disposed over an aperture in airbag membrane 1110. A tether holder such as sleeve 1142 with holes referred to as sleeve apertures 1144 may be used to hold a portion of closeable vent strap 1150. Closeable vent strap 1150 is retained within sleeve 1142 via stitching 1146.

Closeable vent 1140 may be embodied with a generally cylindrical shape. Vent 1140 may have any suitable shape such as rectangular, triangular, or polygon shapes. The cinch tube may be embodied with a height that is sufficient to achieve desired closure. In one embodiment, the cinch tube has height which is about half of its diameter. Selecting an appropriate height to diameter ratio permits the cinch tube to close during cinching without resistance from cushion membrane tension. The design permits the cinch tube to be a low-stress element in the cushion assembly which is helpful during unfolding of the cushion and pressurization. The cinch tube may comprise a nylon woven fabric-type or other suitable material known in the art.

When tension is applied to closeable vent strap 1150 (as in FIG. 11B), rim 1149 may be at least partially drawn together by the portion of closeable vent strap 1150 that is within sleeve 1142. The drawing together of rim 1149 may at least partially block the escape of inflation gas from the interior of airbag membrane 1110 via closeable vent 1140.

Figure 12:
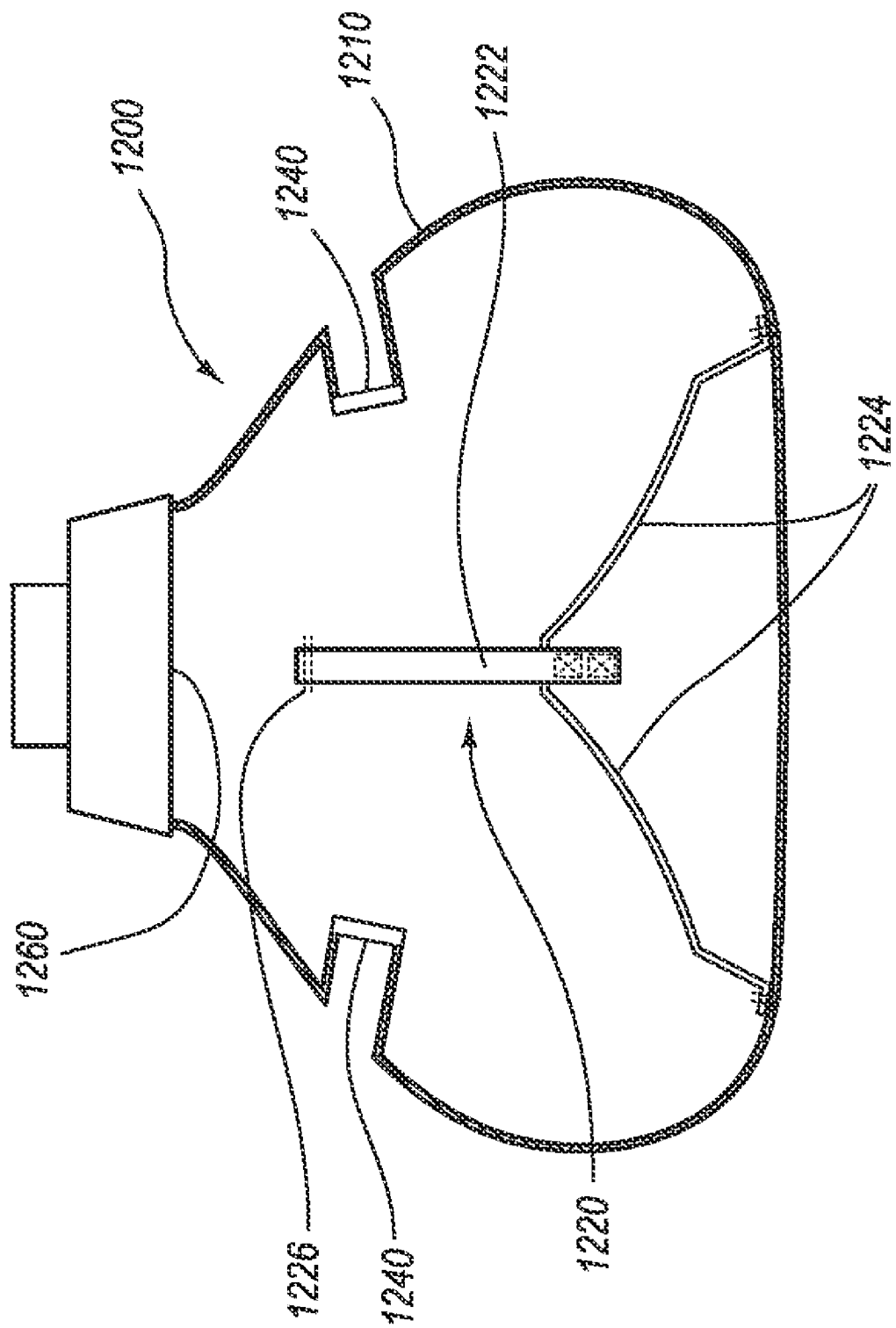
FIG. 12 is a top elevation view of another embodiment of an inflatable cushion airbag assembly wherein the cushion is deployed to a second configuration.

FIG. 12 is a top elevation view of another embodiment of an inflatable airbag cushion assembly 1200, which is configured to function similarly to the airbag assemblies described above. Assembly 1200 comprises an airbag membrane 1210, an airbag depth restraining tether 1220, closeable vents 1240, and a release device 1260. Closeable vent straps are not shown in this view, but may be configured as those described above or below (see FIGS. 13A and 13B). Closeable vent straps may be coupled to the closeable vent and extend to and be attached to the airbag depth restraining tethers, a lap-proximal surface of the airbag membrane, or a face-proximal surface of the airbag membrane. Airbag assembly 1200 constitutes an alternative configuration for coupling airbag depth restraining tethers and a release device, as well as coupling airbag depth and height restraining tethers to a release device. Thus, the configuration of airbag assembly 1200 may be used with any of the above or below described airbag assemblies.

Airbag depth restraining tether 1220 may comprise at least three separate pieces of material, an intermediate portion 1222, and distal portions 1224. Distal portions 1224 are attached to an intermediate portion via stitching, which may comprise box stitching. Intermediate portion 1222 and distal portions 1224 may comprise pieces of nylon webbing. An end portion 1226 may be attached to release mechanism 1260 when the airbag assembly is in an undeployed conformation or is deployed to a first configuration, as described above for previous airbag assemblies. Upon deployment to a second configuration, end portion 1226 may be released, thereby allowing airbag membrane 1210 to expand and close vents 1240 by pulling taut vent straps (not shown).

Figure 13B:
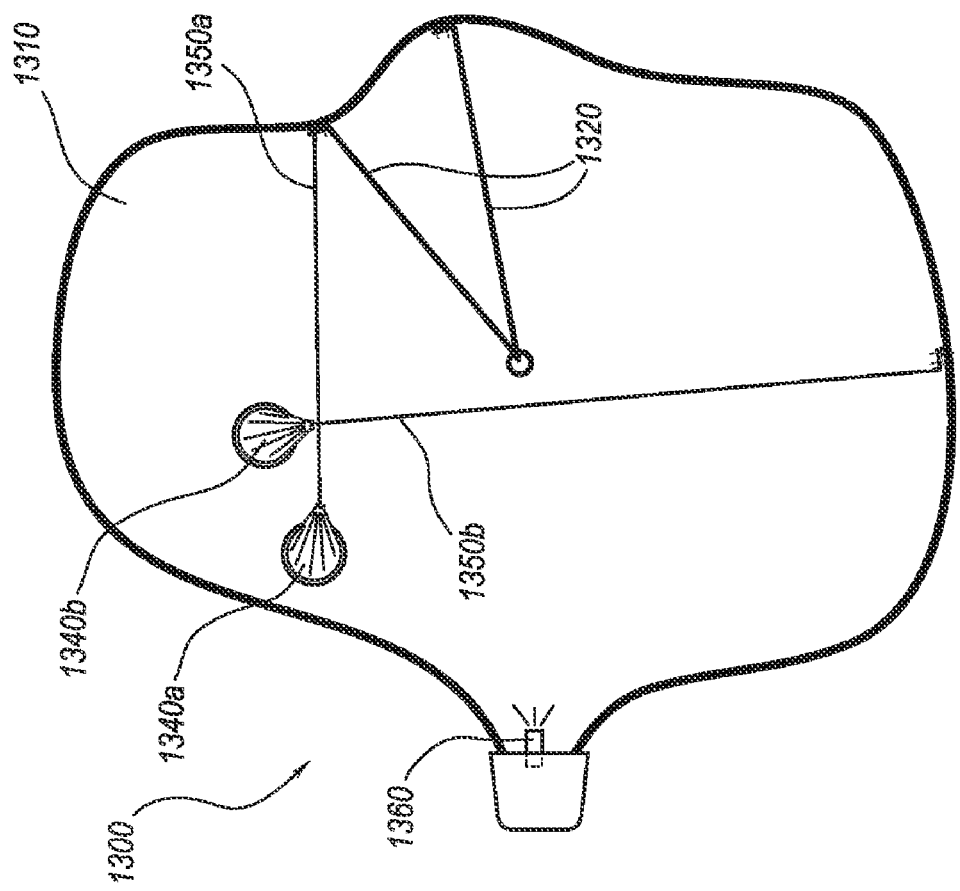
FIG. 13B is a side elevation view of the inflatable cushion airbag assembly of FIG. 13A wherein the cushion is deployed to a second configuration.
Figure 13A:
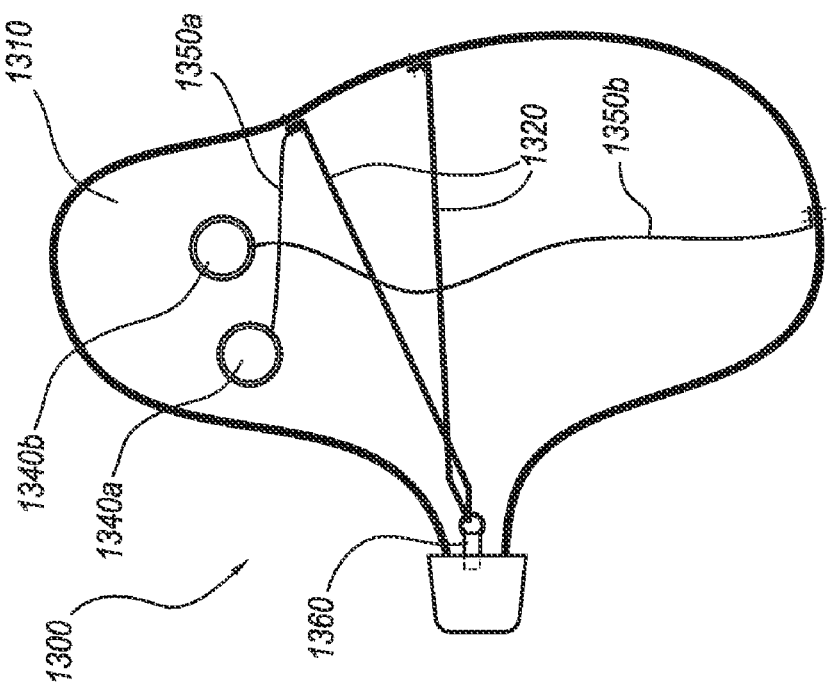
FIG. 13A is a side elevation view of another embodiment of an inflatable cushion airbag assembly wherein the cushion is deployed to a first depth.

FIGS. 13A and 13B depict another embodiment of an inflatable airbag cushion assembly 1300 from a side elevation cutaway view. Configured to function similarly to the airbag assemblies described above, assembly 1300 may comprise an airbag membrane 1310, airbag depth restraining tethers 1320, closeable vents 1340a and 1340b, vent straps 1350a and 1350b, and a release device 1360.

When deployed to a first configuration, as in FIG. 13A, airbag assembly 1300 may be restricted in its deployment in the direction of an occupant's torso and lap by airbag depth restraining tethers 1320. Release device 1360 may be directly attached to airbag depth restraining tethers 1320 or may be coupled to tethers 1320 via a ring or loop.

As with previous embodiments, the location of closeable vents 1340a and 1340b depicted in FIGS. 13A and 13B is strictly for illustrative purposes and may vary according to different applications. Upon deployment to the first configuration, closeable vents 1340a and 1340b remain open, because vent straps 1350a and 1350b are of such a length that they remain slack in the first configuration.

To initiate deployment to a second configuration, release device 1360 releases airbag depth restraining tethers 1320, thus allowing airbag membrane 1310 to expand beyond the first configuration. Vent straps 1350a and 1350b are coupled to airbag membrane 1310 and are of a predetermined length such that during expansion of membrane 1310, vent straps 1350a and 1350b are pulled taut, which in turn, pulls shut closeable vents 1340a and 1340b.

The position of closeable vents 1340a and 1340b as depicted in FIGS. 13A and 13B is strictly for illustrative purposes and may vary according to application. Closeable vent straps 1350a and 1350b may comprise pieces of cord, or nylon webbing. Airbag depth restraining tethers 1320 may comprise nylon webbing.

The airbag membranes 110, 410, 810, 910, 1010, 1110, 1210, 1310 disclosed herein are examples of means for cushioning an occupant of a vehicle during a collision event. The airbag depth restraining tethers 120, 420, 820, 920, 1020, 1220, 1320 disclosed herein are examples of means for restricting the depth of the expansion of an inflatable cushion airbag. The airbag height restraining tethers 130, 430, 730, 1030, disclosed herein are examples of means for restricting the expansion of the height of an inflatable cushion airbag.

Furthermore, the closeable vents 140, 440, 840, 940a, 940b, 1040a, 1040b, 1140, 1240, 1340a, 1340b disclosed herein are examples of means for venting inflation gas from the interior of an inflatable cushion airbag. The closeable vent straps 150, 450, 850, 950a, 950b, 1050a, 1050b, 1150, 1350a, 1350b disclosed herein are examples of means for at least partially closing the closeable vents.

Moreover, the release devices 160, 460, 860, 960, 1060, 1260, 1360 disclosed herein are examples of means for releasing the depth and height restraining tethers. Additionally, the seat rail sensor, 170, disclosed herein is an example of means for detecting the for/aft position of an occupant's seat.

Furthermore, any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag assembly comprising:
a release device configured to communicate electronically with a sensor; and,
an inflatable airbag cushion configured to be deployed to a first configuration and a second configuration, wherein the second configuration has a greater volume than the first configuration, the inflatable airbag cushion comprising:
a cushion membrane which defines an interior of the inflatable airbag cushion;
at least one closeable vent disposed on the cushion membrane and configured to vent gas out of the interior of the inflatable airbag cushion, wherein the closeable vent is configured to change from an open state during initial airbag deployment and deployment to the first configuration, to a substantially closed state upon airbag deployment to the second configuration;
at least one closeable vent strap coupled to the closeable vent and extending to, and being coupled to a lap-proximal surface of the inflatable airbag cushion membrane, the closeable vent strap being of such a length that upon deployment of the airbag to the first configuration, the closeable vent strap is sufficiently slack that the closeable vent is not closed, and upon deployment of the airbag to the second configuration, the closeable vent strap is placed under tension by the expansion of the lap-proximal surface of the cushion membrane sufficient to at least partially close the closeable vent;
at least one airbag depth restraining tether attached to a face-proximal surface of the cushion membrane, and extending to, and being releasably coupled to the release device, such that upon deployment of the airbag to the first configuration, the airbag depth restraining tether is not released, and the airbag depth restraining tether limits the depth of inflatable airbag cushion deployment, and wherein deployment to the second configuration is achieved by the release device releasing the airbag depth restraining tether such that the airbag depth restraining tether does not limit the depth of inflatable airbag cushion deployment; and,
at least one airbag height restraining tether releasably coupled to the release device, the airbag height restraining tether extending to, and attached to a lap-proximal surface of the inflatable airbag cushion membrane such that upon deployment of the airbag to the first configuration, the airbag height restraining tether is not released, and the airbag height restraining tether limits the height of the inflatable airbag cushion, the airbag height restraining tether being released for deployment of the airbag to the second configuration such that airbag height restraining tether no longer limits the height of inflatable airbag cushion deployment, allowing the lap-proximal surface of the airbag to expand in a direction of an occupant's lap, the airbag height restraining tether coupled to the at least one airbag depth restraining tether such that after release from the release device, the airbag height restraining tether and airbag depth restraining tethers remain coupled such that the tethers continue to give a predetermined shape to the inflatable airbag cushion membrane.

2. The airbag assembly of claim 1, further comprising a sensor which determines the position of an occupant's seat, such that if the occupant's seat is within a predetermined distance from a front panel of a vehicle, upon deployment of the inflatable airbag cushion, the release device does not release the airbag restraining tethers and the airbag is deployed to the first configuration and if the occupant's seat is further than a predetermined distance from the front panel of the vehicle, upon inflatable airbag cushion deployment, the release device releases the airbag restraining tethers, and the inflatable airbag cushion may be deployed to the second configuration.

3. The airbag assembly of claim 2, further comprising:
at least one second closeable vent, the second closeable vent disposed on the cushion membrane and configured to vent gas out of the interior of the inflatable airbag cushion, wherein the second closeable vent is configured to change from an open state during initial airbag deployment and deployment to the first configuration to a substantially closed state upon airbag deployment to the second configuration, at least one second closeable vent strap; and,
the at least one second closeable vent strap coupled to the at least one second closeable vent and extending to and being attached to the face-proximal surface of the cushion membrane, the second closeable vent strap being of such a length that upon deployment of the airbag to the first configuration, the second closeable vent strap is sufficiently slack that the second closeable vent strap does not put tension on the second closeable vent and does not close the second closeable vent, the second closeable vent strap further configured such that when the airbag depth restraining tether is release for deployment of the airbag to the second configuration, the second closeable vent strap is placed under tension sufficient to close the second closeable vent due to the expansion of the cushion membrane in the direction of a vehicle cabin.

4. The airbag assembly of claim 2 further comprising:

at least one second closeable vent, the second closeable vent disposed on the cushion membrane and configured to vent gas out of the interior of the inflatable airbag cushion, wherein the second closeable vent is configured to change from an open state during initial airbag deployment and deployment to the first configuration to a substantially closed state upon airbag deployment to the second configuration, at least one second closeable vent strap: and, the at least one second closeable vent strap coupled to the at least one second closeable vent and extending to and being coupled to the at least one airbag height restraining tether and the at least one airbag depth restraining tether, the second closeable vent strap being of such a length that upon deployment of the airbag to the first configuration, the second closeable vent strap is sufficiently slack that the second closeable vent strap does not put tension on the second closeable vent and does not close the second closeable vent, the second closeable vent strap further configured such that when the airbag depth restraining tether is released for deployment of the airbag to the second configuration, the second closeable vent strap is placed under tension sufficient to close the second closeable vent due to the expansion of the cushion membrane in the direction of a vehicle cabin.

5. An airbag assembly, comprising:

a release device configured to communicate electronically with a sensor; and, an inflatable airbag cushion configured to be deployed to a first configuration and a second configuration, wherein the second configuration has a greater volume than the first configuration, the inflatable airbag cushion comprising:

a cushion membrane which defines an interior of the inflatable airbag cushion;

at least one airbag depth restraining tether attached to a face-proximal surface of the cushion membrane and extending to, and being releasably coupled to the release device, such that upon deployment of the airbag to the first configuration, the airbag depth restraining tether is not released, and the airbag depth restraining tether limits the depth of inflatable airbag cushion deployment, and wherein deployment to the second configuration is achieved by the release device releasing the airbag depth restraining tether such that the airbag depth restraining tether does not limit the depth of inflatable airbag cushion deployment;

wherein the at least one airbag depth restraining tether comprises at least one intermediate portion comprising an elongated piece of material, the intermediate portion having an end portion which may be coupled to a release device when the airbag assembly is in an undeployed configuration or is deployed to a first configuration; and, at least two distal portions comprising pieces of material, wherein the distal portions are attached to the intermediate portion and extend to and are attached to the face-surface of the cushion membrane, the two distal portions bilaterally symmetrically disposed on the face-surface on opposite sides of a vertically oriented mid-line of the deployed cushion membrane;

at least one airbag height restraining tether releasably coupled to the release device, the airbag height restraining tether extending to, and attached to a lap-proximal surface of the inflatable airbag cushion membrane such that upon deployment of the airbag to the first configuration, the airbag height restraining tether is not released, and the airbag height restraining tether limits the height of the inflatable airbag cushion, the airbag height restraining tether being released for deployment of the airbag to the second configuration such that airbag height restraining tether no longer limits the height of inflatable airbag cushion deployment, allowing the lap-proximal surface of the airbag to expand in a direction of an occupant's lap, the airbag height restraining tether coupled to the at least one airbag depth restraining tether such that after release from the release device, the airbag height restraining tether and airbag depth restraining tethers remain coupled;

at least one closeable vent disposed on the cushion membrane and configured to vent gas out of the interior of the inflatable airbag cushion, wherein the closeable vent is configured to change from an open state during initial airbag deployment and deployment to the first configuration, to an at least partially closed state upon airbag deployment to the second configuration; and, at least one closeable vent strap coupled to the closeable vent and extending to and coupled to the at least one airbag depth restraining tether, the closeable vent strap being of such a length that upon deployment of the airbag to the first configuration, the closeable vent strap is sufficiently slack that the closeable vent is not closed, and upon deployment of the airbag to the second configuration, the closeable vent strap is placed under tension by the expansion of the lap-proximal surface of the cushion membrane sufficient to at least partially close the closeable vent.

6. The airbag assembly of claim 5, further comprising a sensor which determines the position of an occupant's seat, such that if the occupant's seat is within a predetermined distance from a front panel of a vehicle, upon deployment of the inflatable airbag cushion, the release device does not release the airbag restraining tethers and the airbag is deployed to the first configuration and if the occupant's seat is further than a predetermined distance from the front panel of the vehicle, upon inflatable airbag cushion deployment, the release device releases the airbag restraining tethers, and the inflatable airbag cushion may be deployed to the second configuration.

7. The airbag assembly of claim 5, wherein the closeable vent comprises a cinch tube vent.

8. The airbag assembly of claim 5, further comprising:

at least one second closeable vent, the second closeable vent disposed on the cushion membrane and configured to vent gas out of the interior of the inflatable airbag cushion, wherein the second closeable vent is configured to change from an open state during initial airbag deployment and deployment to the first configuration to a substantially closed state upon airbag deployment to the second configuration, at least one closeable vent strap; and, the at least one second closeable vent strap coupled to the at least one second closeable vent and extending to and being attached to the lap-proximal surface of the cushion membrane, the second closeable vent strap being of such a length that upon deployment of the airbag to the first configuration, the second closeable vent strap is sufficiently slack that the second closeable vent strap does not put tension on the second closeable vent and does not close the second closeable vent, the second closeable vent strap further configured such that when the airbag depth restraining tether is released for deployment of the airbag to the second configuration, the second closeable vent strap is placed under tension sufficient to close the second closeable vent due to the expansion of the cushion membrane in the direction of a vehicle cabin.

* * * * *